United States Patent
Horton

(10) Patent No.: US 10,309,473 B2
(45) Date of Patent: Jun. 4, 2019

(54) APPARATUS AND METHOD FOR HEAT DISSIPATION OF A BRAKE PAD

(71) Applicant: Edward D. Horton, Glen Carbon, IL (US)

(72) Inventor: Edward D. Horton, Glen Carbon, IL (US)

(*) Notice: Subject to any disclaimer, the term of this patent is extended or adjusted under 35 U.S.C. 154(b) by 0 days.

(21) Appl. No.: 15/256,866

(22) Filed: Sep. 6, 2016

(65) Prior Publication Data

US 2017/0067524 A1    Mar. 9, 2017

Related U.S. Application Data

(60) Provisional application No. 62/334,195, filed on May 10, 2016, provisional application No. 62/214,283, filed on Sep. 4, 2015.

(51) Int. Cl.
*F16D 65/092* (2006.01)
*F16D 65/847* (2006.01)
*F16D 65/78* (2006.01)

(52) U.S. Cl.
CPC ......... *F16D 65/847* (2013.01); *F16D 65/092* (2013.01); *F16D 2065/789* (2013.01)

(58) Field of Classification Search
CPC ............... F16D 65/092; F16D 65/847; F16D 2065/1332; F16D 2065/789
See application file for complete search history.

(56) References Cited

U.S. PATENT DOCUMENTS

| | | | | |
|---|---|---|---|---|
| 2,909,244 | A * | 10/1959 | Kraft | B60G 17/052 188/176 |
| 3,277,985 | A * | 10/1966 | Caskey | F16D 65/092 188/250 B |
| 4,036,333 | A * | 7/1977 | Mathauser | B62L 1/005 188/24.11 |
| 4,130,186 | A * | 12/1978 | de Gennes | F16D 53/00 188/250 B |
| 6,386,334 | B2 | 5/2002 | Wang | |
| 6,793,057 | B1 | 9/2004 | Smith, Jr. | |
| 7,028,813 | B2 | 4/2006 | MacKarvich | |
| 7,097,007 | B2 | 8/2006 | Lin | |
| 7,581,624 | B2 | 9/2009 | Byers et al. | |
| 7,934,586 | B1 | 5/2011 | Black | |
| 8,127,899 | B2 * | 3/2012 | Cress | F16D 55/38 188/250 B |
| D685,304 | S * | 7/2013 | Moore | D12/180 |
| 8,770,352 | B2 | 7/2014 | Horio et al. | |
| 9,022,184 | B2 | 5/2015 | Passalacqua et al. | |
| 9,151,350 | B2 | 10/2015 | Nadal Aloy | |
| 9,206,869 | B2 | 12/2015 | Wen | |
| 9,267,557 | B2 | 2/2016 | Boyle | |

(Continued)

FOREIGN PATENT DOCUMENTS

DE     19706123 A1 *  8/1998  .......... F16D 65/092
EP     2360387 B1      8/2013
(Continued)

*Primary Examiner* — Bradley T King
(74) *Attorney, Agent, or Firm* — Quarles & Brady LLP

(57) ABSTRACT

A device for braking a vehicle includes a first brake pad and a first back plate coupled to the first brake pad and comprising a first plurality of ridges provided on a first face of the first brake plate. The device and corresponding method provide an improved manner for cooling existing brake systems.

20 Claims, 12 Drawing Sheets

(56) References Cited

U.S. PATENT DOCUMENTS

| | | | |
|---|---|---|---|
| 9,303,706 B2 | 4/2016 | Wen | |
| 2001/0047858 A1* | 12/2001 | McCullough | H01L 23/3672 165/80.3 |
| 2003/0168292 A1* | 9/2003 | Kuo | B62L 1/005 188/24.11 |
| 2006/0131000 A1* | 6/2006 | Liu | H01L 23/467 165/80.3 |
| 2008/0156600 A1* | 7/2008 | Eastham | F16D 65/0006 188/250 B |
| 2009/0173184 A1* | 7/2009 | Beutler | B60B 35/163 74/606 A |
| 2012/0000735 A1* | 1/2012 | Iwai | F16D 65/092 188/26 |
| 2012/0160616 A1 | 6/2012 | Passalacqua et al. | |
| 2013/0240311 A1 | 9/2013 | Camilo-Martinez et al. | |
| 2013/0277160 A1* | 10/2013 | Dreher | F16D 65/092 188/250 B |
| 2015/0176669 A1* | 6/2015 | Wen | F16D 65/092 188/250 B |
| 2015/0211590 A1 | 7/2015 | Tseng | |
| 2016/0003317 A1* | 1/2016 | Buxton | F16D 69/00 188/250 B |
| 2016/0160950 A1 | 6/2016 | Wen | |
| 2016/0195147 A1* | 7/2016 | Carney | F16D 65/092 188/250 B |
| 2016/0208870 A1 | 7/2016 | Rguichi et al. | |
| 2016/0281806 A1 | 9/2016 | Joseph | |
| 2017/0184168 A1* | 6/2017 | Wen | F16D 65/847 |

FOREIGN PATENT DOCUMENTS

| | | | |
|---|---|---|---|
| EP | 2478252 B1 | 10/2014 | |
| EP | 2902654 A1 | 8/2015 | |
| EP | 2905500 A3 | 9/2015 | |
| JP | 56160437 A1 * | 12/1981 | F16D 65/04 |
| JP | 2014098407 A * | 5/2014 | |

* cited by examiner

APPARATUS AND METHOD FOR HEAT DISSIPATION OF A BRAKE PAD

CROSS REFERENCE TO RELATED APPLICATIONS

This application claims the benefit of pending U.S. Provisional Application No. 62/214,283, filed on Sep. 4, 2015, and U.S. Provisional Application No. 62/334,195, filed on May 26, 2016, which are herein incorporated by reference in their entirety.

BACKGROUND

Brake pads are a component of disc brakes used in automotive and other applications. Although the first disc brakes were developed in the 1890s, mass production in the U.S. did not begin until 1955. Eventually disc brakes surpassed drum brakes in popularity.

Typically, brake pads are steel plates with friction material bound to a surface that faces a disc brake rotor. Brake pads operate by converting the kinetic energy of a vehicle to thermal energy via friction. In normal use, two brake pads are included in a brake caliper with the friction surfaces facing the disc brake rotor. When the brakes are hydraulically applied, the caliper clamps the two brake pads together into the spinning rotor, which slows or stops the vehicle. Because of the heat expelled during the braking process, brake pads usually require regular replacement. Depending on the properties of the material used for the brake pads, the disc wear rates will vary.

Disc brakes are increasingly used on heavy vehicles, such as vans or commercial vehicles, where brake pads can experience increased friction. This increased friction expels more heat via the brake pads to the surrounding atmosphere. The increased heat and friction causes the braking components to warp at a rapid rate, resulting in inadequate brake pads. Others have tried alternatives to dissipate the increased heat including holes or slots in the disc, more pads per caliper, and the use of different materials, such as ceramic, Kevlar, and plastic. However, a need still exists for a cost effective brake pad or brake pad attachment that allows more heat to dissipate from the brake pad assembly.

SUMMARY

In one aspect, a device for braking a vehicle includes a first brake pad and a first back plate coupled with the first brake pad. The first back plate includes a first plurality of ridges provided on a first face of the first back plate. In another aspect, a second back plate is coupled with a second brake pad and positioned opposite the first brake pad. The second back plate includes a second plurality of ridges provided on a first face of the second back plate. In some embodiments, the first back plate is made of metal. In some embodiments, the first plurality of ridges includes a plurality of peaks and a plurality of valleys formed along the first back plate.

In some embodiments, the first and second pluralities of ridges include at least one peak and at least one valley. In other embodiments, the first and second brake pads include a gap. In another aspect, the first and second pluralities of ridges are triangular in shape. In some embodiments, each of the first and second pluralities of ridges includes a plurality of peaks and a plurality of valleys formed along a length of the first plate and the second plate, respectively.

In some embodiments, a device for dissipating heat from a vehicle brake pad assembly includes a first brake pad and a first back plate coupled to the first brake pad. The first back plate includes a first plurality of peaks and a plurality of valleys which form a first plurality of triangular ridges. In another representation, a second back plate is coupled to a second brake pad. The second back plate includes a second plurality of peaks and a second plurality of valleys which form a second plurality of triangular ridges.

In some embodiments, the first plurality of ridges is formed along a length of the first back plate and the second plurality of ridges is formed along an entire length of the second back plate. In some embodiments, the first and second brake pads are facing each other on opposite sides of a rotor.

DETAILED DESCRIPTION

Figure 1:
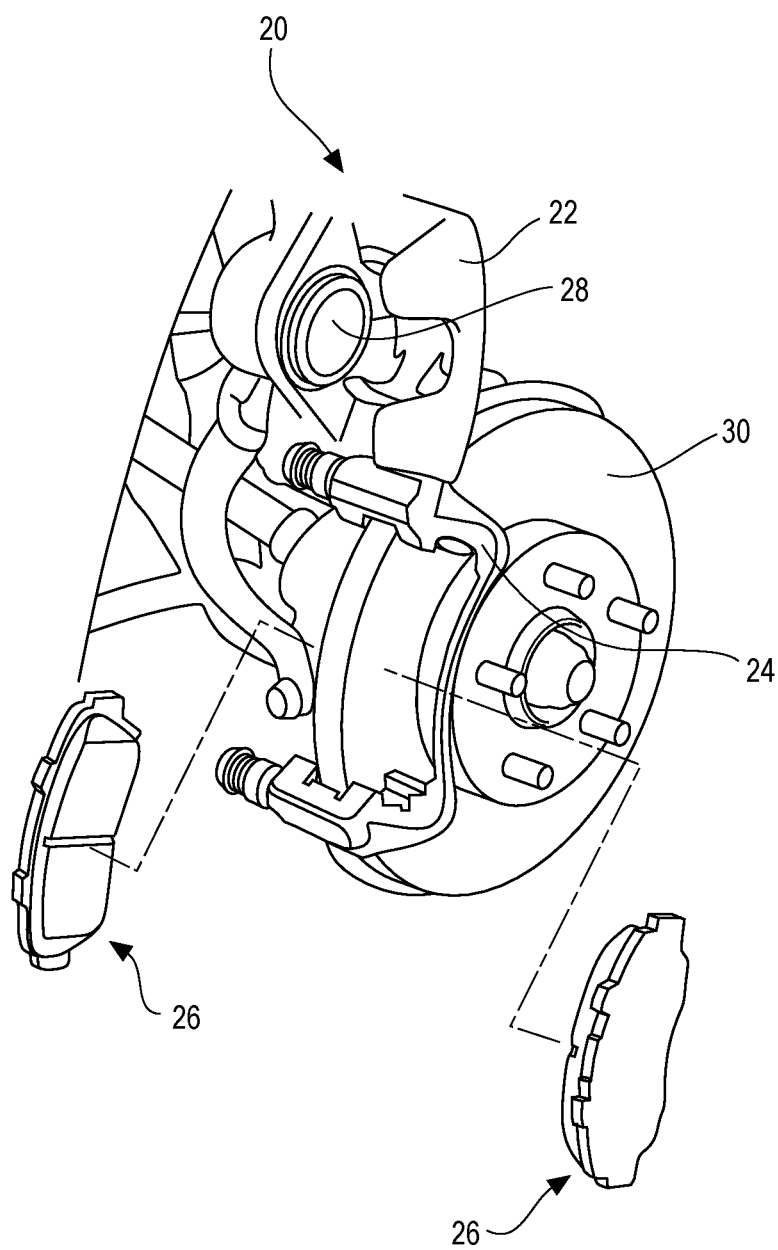
FIG. 1 illustrates an exploded view of a brake caliper assembly.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an exploded view of a brake caliper assembly 20. The brake caliper assembly 20 includes a caliper 22 and a caliper bracket 24, which holds one or more braking devices 26. When a brake piston 28 activates, the caliper bracket 24 compresses the braking devices 26, thereby pressing on a disc brake rotor 30 to slow the vehicle. The illustrated brake caliper assembly 20 is depicted to provide context for the embodiments disclosed herein and is not intended to be a limiting application of the braking device 26.

Figure 2:
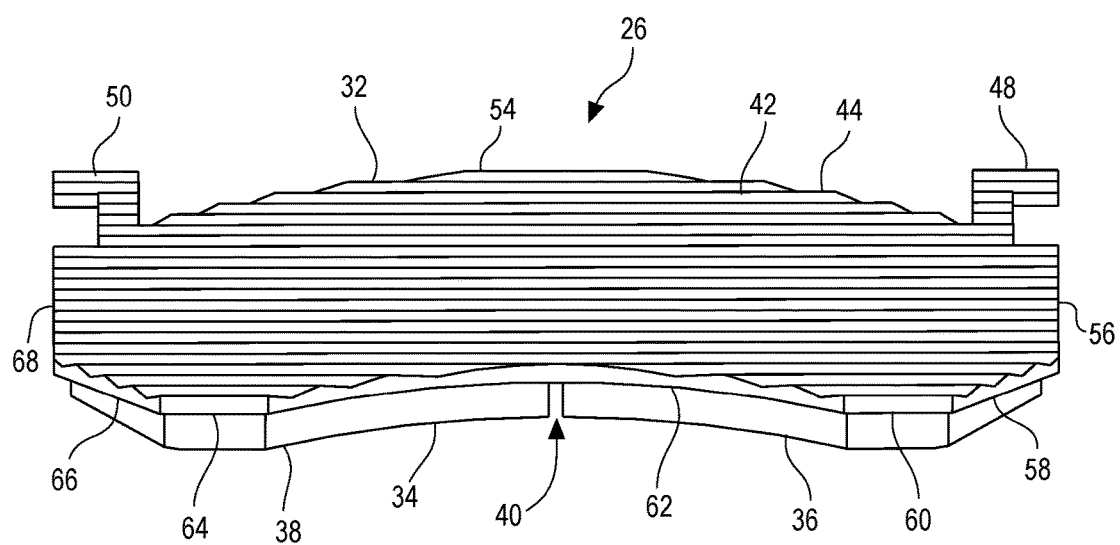
FIG. 2 illustrates a top, front isometric view of an embodiment of an improved braking device.

FIG. 2 illustrates a top, front isometric view of an embodiment of the braking device 26 as disclosed herein. The braking device 26 includes a back plate 32 and a friction lining pad 34 attached to the back plate 32. The back plate 32 may be made of any number of materials including, but not limited to, one or more of steel, aluminum, epoxy-coated metal, copper-coated steel, or any other suitable material(s). The friction lining pad 34 may be made of any number of materials including, but not limited to, one or more of ceramic, Kevlar, plastic, semi-metallic material, organic material with petroleum-based resin, sintered metal, copper, brass, steel, glass, rubber, high-heat resin, or any other suitable material(s).

Still referring to FIG. 2, the friction lining pad 34 is shown in two pieces, a first piece 36 and a second piece 38, separated by a gap 40. Optionally, the friction lining pad 34 may be made of a single, unitary piece or may be separated into multiple pieces. It is envisioned that any number of separate pieces may be used for the friction lining pad 34. The back plate 32 is shown coupled to the friction lining pad 34. The back plate 32 may be coupled to the friction lining pad by heat and pressure (with or without copper coating), glue, mechanical interlocks, or in any other suitable manner.

Figure 3:
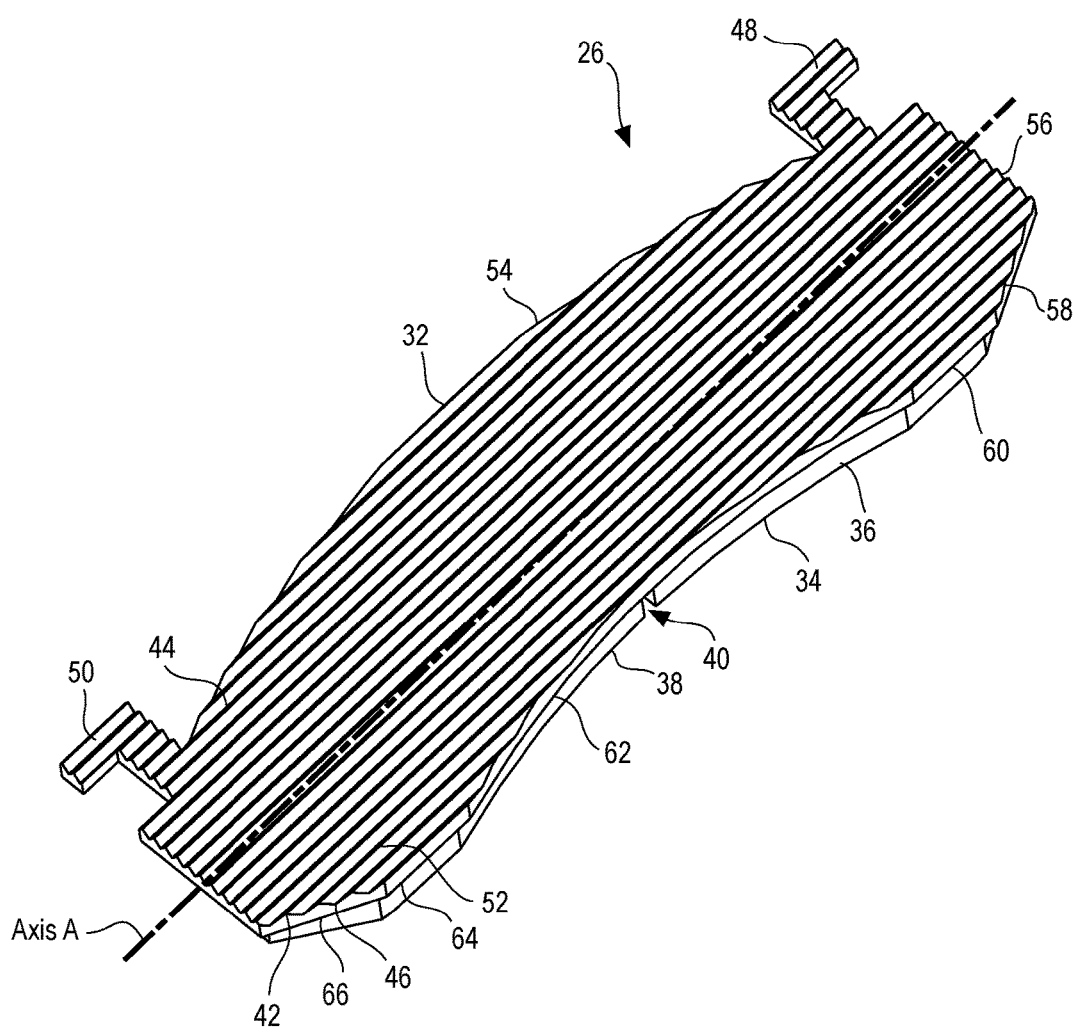
FIG. 3 illustrates a top, left isometric view of the braking device of FIG. 2.
Figure 8:
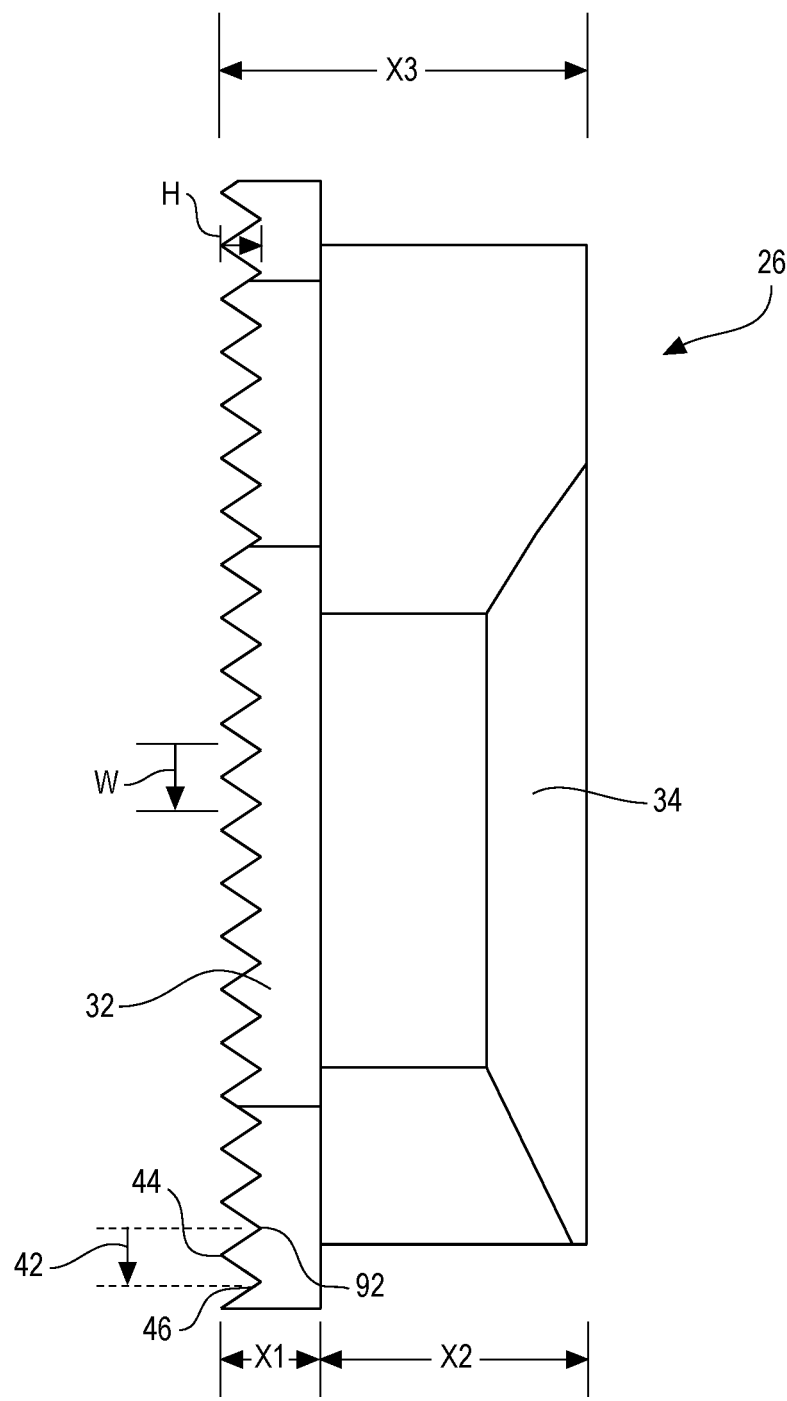
FIG. 8 illustrates a right side elevational view of the braking device of FIG. 2, the left side being a mirror image thereof.

Referring now to FIGS. 3 and 8, the back plate 32 includes a plurality of cooling channels or ridges 42, which include a plurality of peaks 44 and a plurality of valleys 46. The plurality of ridges 42 are shown having a generally triangular configuration; however, any geometric shape is envisioned including, but not limited to, squares, rectangles, circles in the form of a sinusoidal wave, trapezoids, ellipses, pentagons, octagons, any other suitable shape, or any combination of the foregoing shapes and/or other suitable shapes. In the illustrated embodiment, the plurality of ridges 42 form equilateral triangles, as will be described in greater detail hereinafter below. Still referring to FIG. 3, the plurality of ridges 42 are shown parallel to an axis A, which extends longitudinally along a length of the back plate 32. In an illustrative embodiment, the plurality of peaks 44 and the plurality of valleys 46 are parallel to the axis A, for aerodynamic reasons, as will be described below. It is envisioned that the plurality of peaks 44 and the plurality of valleys 46 could be provided along a different axis along the back plate 32.

Figure 4:
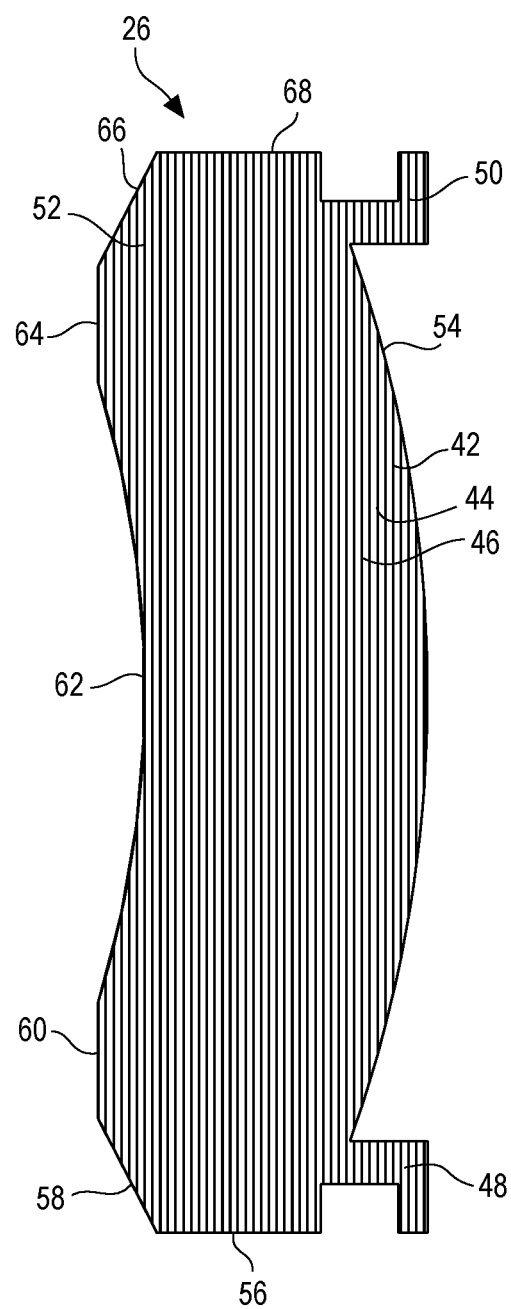
FIG. 4 illustrates a top plan view of the braking device of FIG. 2.

Now referring to FIG. 4, a top view of the braking device 26 is illustrated. The back plate 32 may include a first locating tab 48 and a second locating tab 50, which are used for attaching and centering the braking device 26 within the brake caliper assembly 20. While the illustrated embodiment includes locating tabs 48, 50 for holding the braking device 26 in place, one of ordinary skill in the art would recognize that any number of locating tabs could be used depending on the vehicle within which the device 26 would be attached. In another embodiment, the braking device 26 need not include locating tabs 48, 50.

Figure 5:
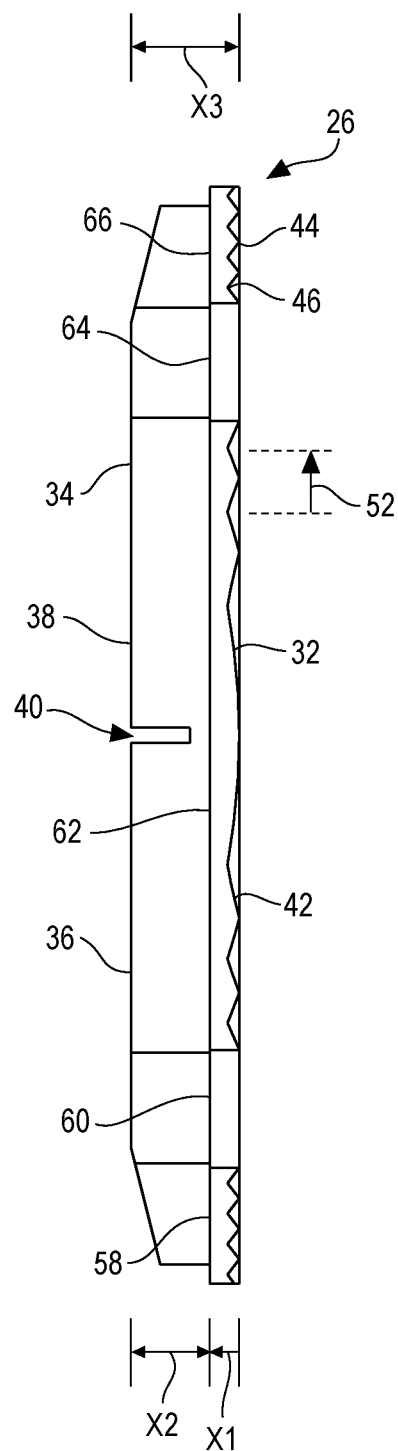
FIG. 5 illustrates a front plan view of the braking device of FIG. 2.
Figure 6:
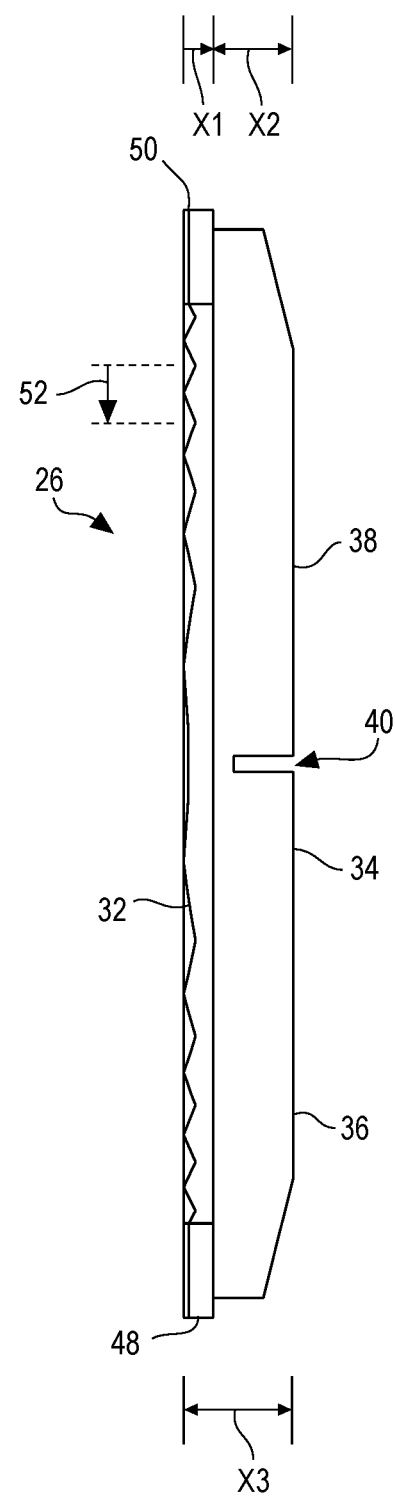
FIG. 6 illustrates a rear plan view of the braking device of FIG. 2.

Referring to FIGS. 5, 6, and 8, thicknesses of the back plate 32 and the friction lining pad 34 are depicted. Referring to FIGS. 5 and 8, the illustrated back plate 32 has a plate thickness X1 of between about 1 mm and about 10 mm, or between about 3 mm and about 8 mm, or about 5 mm. The friction lining pad 34 has a pad thickness X2 of between about 2 mm and about 15 mm, or between about 5 mm and about 12 mm or about 9 mm. When combined, the back plate 32 and the friction lining pad 34 provide a total thickness X3 of between about 4 mm and about 25 mm, or between about 10 mm and about 20 mm or about 16.5 mm for the braking device 26. As one of ordinary skill in the art would appreciate, the total thickness X3 of the device 26 may be limited by the available space within the vehicle and/or the rotor assembly within which the braking device 26 is mounted. As a result, a total thickness X3 restriction exists within any rotor assembly due to the available space. Thus, the plate thickness X1 and the pad thickness X2 must be varied to accommodate such a restriction. As the plate thickness X1 increases, the pad thickness X2 may necessarily be decreased to accommodate the total thickness X3 restriction.

Still referring to FIGS. 5, 6, and 8, in a typical braking device 26, based upon values retrieved from www.alibaba.com, the cost in U.S. dollars of a typical friction lining pad 34 is about $7.80 more than the cost of a back plate 32. The average cost of a typical friction lining pad 34 is about $13.00 while the cost of a typical back plate 32 is about $5.20. As such, from a cost perspective, reducing the pad thickness X2 is beneficial to both consumers and producers. The foregoing cost estimates are utilized only to provide a relative cost for a back plate 32 and a friction lining pad 34.

If the thickness X1 of the back plate 32 increases by about 5 mm, then due to the total thickness X3 restriction, the thickness X2 of the friction lining pad 34 necessarily must be decreased by about 5 mm. Based upon the aforementioned prices, utilizing less of the friction lining pad 34 reduces the cost of the device 26. Also, due to an increased thickness of the back plate 32, the height of the plurality of ridges 42 is greater than the height of a brake pad having a flat back plate. Further, the plurality of ridges 42 increase the surface are of the back plate 32, which allows for more contact with air particles that flow across the back plate 32. As a result, a faster cooling rate is achieved, as will be described below. Due to a more efficient cooling rate, the friction lining pad 34 does not wear out as quickly, thus, the life of the thinner brake pad is not reduced. Still further, the life of the friction lining pad 34 remains the same as a typical brake pad due to the increased surface area along the back plate 32, even though the typical brake pad has a thicker lining pad.

Conversely, increasing the thickness X2 of the friction lining pad 34 is also beneficial to the consumer and producer. Still referring to FIGS. 5, 6, and 8, because the surface area along the back plate 32 is still greater than if the back plate 32 were flat, and, thus, more heat is expelled, an increased thickness X2 necessarily increases the life span of the braking device 26. If the pad thickness X2 increases, then the friction lining pad 34 has more material, which will wear down at the same rate as a typical brake pad. In this embodiment, the back plate 32 still includes a plurality of ridges 42 that aid in cooling the friction lining pad 34. More particularly, heat generated at the friction lining pad 34 emanates outwardly to the back plate 32 and dissipates more quickly due to air moving through the ridges 42. Combining the thicker friction lining pad 34 and the more efficient cooling of the back plate 32, the life of the braking device 26 (and the friction lining pad 34) increases. Although this particular embodiment of the braking device 26 may cost more due to the increased thickness X2 of the friction lining pad 34, the life span of the braking device 26 increases. Thus, consumers benefit because the braking device 26 does not need to be replaced as often. If consumers use a commercial service to change the braking device 26, they can also save money on labor costs because they need not replace the braking device 26 as often.

Still referring to FIGS. 5, 6, and 8, as one of ordinary skill in the art would appreciate, a thicker back plate thickness X1 allows for a thinner friction lining pad thickness X2 due to more efficient heat dissipation. For example, if the back plate thickness X1 increases, heat from the friction lining pad 34 dissipates more quickly due to an increased surface area of the back plate 32. The heat released from the device 26 can be modeled with Newton's Law of Cooling, which states that $q=h_c A(T_s-T_a)$, where q is the rate of heat transfer per unit time (Joules), A is the heat transfer surface area (m$^2$), $h_c$ is the convective heat transfer coefficient (no unit of measurement), and $(T_s-T_a)$ is the temperature difference (° C.) between the surface and the air. Therefore, in an embodiment having an increased plate thickness X1, to maintain a similar brake pad wear rate, a decreased pad thickness X2 may be utilized because the friction lining 34 pad cools more quickly and wears down more slowly due to the increased rate of heat transfer, q, resulting from the greater surface area of the back plate 32.

As stated above, the plurality of ridges 42 increases the surface area along the back plate. In some embodiments, the plurality of ridges 42 comprise isosceles triangles, and in other embodiments, the triangles are equilateral triangles. Using equilateral triangles for the plurality of ridges 42 provides twice the surface area for the back plate 32. In one non-limiting example, if the back plate 32 is 10 cm wide and 30 cm long, then a flat version of such a back plate has a surface area of about 300 cm$^2$ (surface area=10 cm×30 cm). If the back plate 32 includes the plurality of ridges 42 (total of 100) running parallel to the length, then each individual ridge 52 has a base of 0.1 cm (base length=10 cm/100). Further, each side of the equilateral triangle has a length of 0.1 cm. As a result, the total surface area of the back plate 32 is 600 cm$^2$ (surface area=100 ridges×0.1 cm×2 sides/ridge×30 cm). Referring back to Newton's Law of Cooling, $q=h_c A(T_s-T_a)$, the heat transfer rate is linearly proportional to the surface area. As such, if the surface area doubles, then the heat transfer rate doubles.

Referring to another example wherein the back plate 32 is 10 cm wide and 30 cm long, using triangles where the first angle Θ is more than 60°, the plurality of ridges 42 provides less surface area for the back plate 32. If the height of the plurality of ridges 42 in this example remains the same as the previous equilateral triangular ridges, then the height of the ridge is 0.087 cm (height=0.1 cm/2*√3). If the first angle Θ at the peak of the ridge is 70°, then, using the Pythagorean Theorem, the length of each base of the ridge is 0.12 cm and the length of each side of the triangle is 0.11 cm long. As a result, about 83 ridges can fit on the 10 cm plate. Therefore, the total surface area of the back plate 32 is about 548 cm$^2$ (surface area=83 ridges×0.11 cm/side×2 sides/ridge×30 cm).

Referring to yet another example, using triangles where the first angle Θ is less than 60° creates more surface area on the back plate 32 but structural integrity is lost with such triangular ridges. In this example, while still modeling the back plate as a 10 cm wide by 30 cm long plate, if the height of the triangular ridges remains the same as the previous equilateral triangular ridges, then the height of the ridge again is 0.087 cm. If the first angle Θ at the peak of the ridge is 50°, then, using the Pythagorean Theorem, the length of the base is 0.080 cm and the length of each side of the triangle is 0.096 cm. If each ridge has a base length of 0.080 m, then 125 ridges can fit on the 10 cm plate. Therefore, the total surface area is 720 cm$^2$ (surface area=125 ridges×0.096 cm/side×2 sides/ridge×30 cm). However, the structural integrity of these ridges is not as strong as the equilateral triangle, wherein the symmetry of the equilateral triangle helps distribute the force applied to the back plate 32 when the brake caliper assembly 20 is activated.

Figure 7:
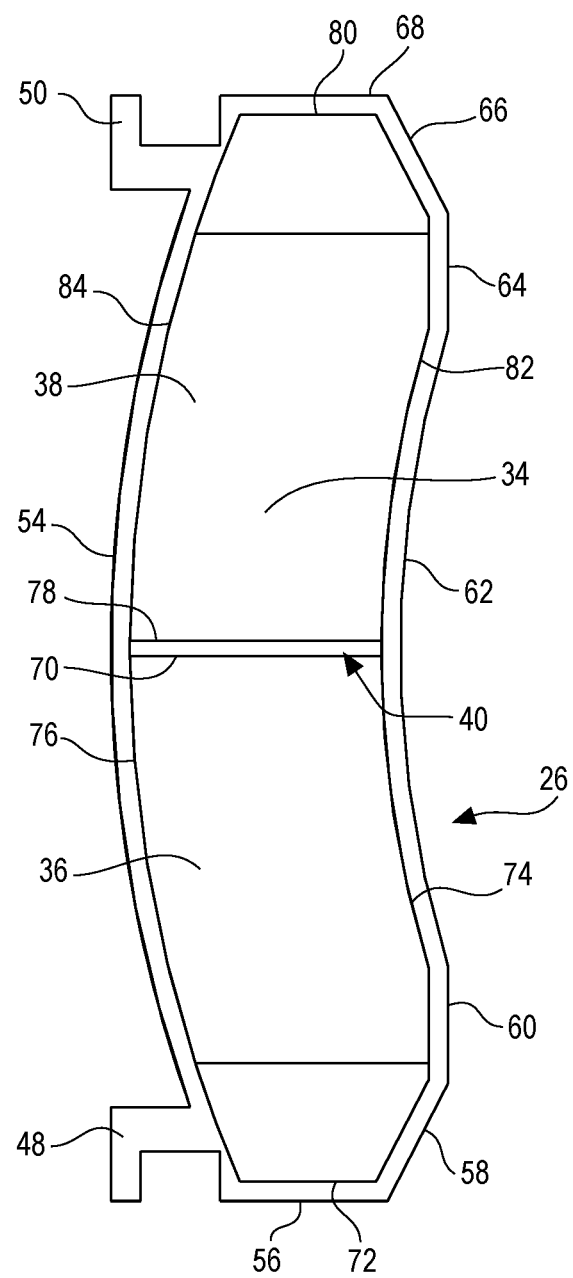
FIG. 7 illustrates a bottom plan view of the braking device of FIG. 2.

As illustrated in FIG. 7, the first locating tab 48 is coupled with a curved top side 54 and is generally perpendicular to a first lateral side 56, which joins to a first bottom side 58. The first bottom side 58 connects to a second bottom side 60. The second bottom side 60 joins to a curved bottom side 62, which also connects to a third bottom side 64. The third bottom side 64 joins to a fourth bottom side 66. The fourth bottom side 66 intersects a second lateral side 68. The second lateral side 68 is generally perpendicular to the second locating tab 50, which connects to the curved top side 54.

Still referring to FIG. 7, the back plate 32 and/or friction lining pad 34 may be any suitable shape, which may or may not be the same as one another. For instance, the friction lining pad 34 may be a square, a rectangle, an oval, or any other suitable shape. The first piece 36 of the friction lining pad 34 may have a first gap face 70, a first rotor face 72, a first curved side 74, and a second curved side 76. The second piece 38 of the friction lining pad 34 may similarly have a second gap face 78, a second rotor face 80, a third curved side 82, and a fourth curved side 84. In one embodiment, the gap faces 70, 78 of the pieces 36, 38 are formed to mate with the disc brake rotor 30, such that when the brake caliper assembly 20 is activated, the entire friction lining pad 34 contacts the disc brake rotor 30 to brake the wheel of the vehicle.

Referring to FIG. 8, a side view of the braking device 26 is shown. The plurality of peaks 44 and the plurality of valleys 46 are more clearly defined in this view. A first ridge 42a, which comprises a first peak 44a, a first valley 46a and a second valley 46b, is pointed out for purposes of describing an illustrative embodiment of one of the plurality of ridges 42. The plurality of ridges 42 may be formed having the same geometric shape, or may have different shapes. For example, a single peak may be in the shape of a triangle, while another peak may be in the shape of a square, while another may be in the shape of a semicircle. However, in an exemplary embodiment, the plurality of peaks 44 and the plurality of valleys 46 are the same shape and are equilateral triangles. Equilateral triangles have experimentally been found to be the best option as they provide the strongest structural integrity of the embodiments tested, while maintaining a maximized surface area.

Figure 9:
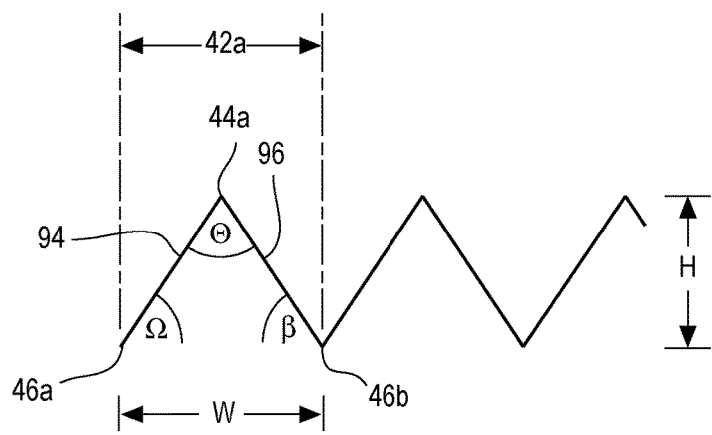
FIG. 9 illustrates an enlarged view of the device of FIG. 8.

Referring to FIG. 9, the first ridge 42 has a height H and a width W. In one embodiment, the plurality of ridges 42 have the same height H and the same width W as the first ridge 42. The height H may be between about 1.00 mm and about 2.50 mm, or between about 1.50 mm and 2.00 mm, or about 1.905 mm. The width W may be between about 1.50 mm and about 3.50 mm, or between about 2.00 mm and about 3.00 mm, or about 2.54 mm.

An enlarged view of the first ridge 42, including the first peak 44, a portion of the first valley 46a, and a portion of the second valley 46b, is illustrated in FIG. 9. The first ridge 42 has a first leg 94 and a second leg 96. The first ridge 42 may be further defined by the width W. The width W, as determined by the height of the ridge H and the first angle Θ of the first peak 44a, restricts how many ridges may be disposed along the back plate 32, and thus, defines the surface area of the back plate 32. In an illustrative embodiment, dimensions of the legs 94, 96 and the width W are the same because, together, the legs 94, 96 and the width W form an equilateral triangle. Further, the first ridge 42, which defines an equilateral triangle, includes a first angle Θ, a second angle Ω, and a third angle β. The angles Θ, Ω, and β of the plurality of ridges 42 may be the same or different depending on the shape and/or other dimensions of the plurality of peaks 44 and/or valleys 46, as described above. In some embodiments, if a triangular peak is followed by a squared peak or a different shaped peak, different angles may be used.

In an exemplary embodiment, all three angles, Θ, Ω, and β, are 60° to reflect the preference for the equilateral triangular peaks and valleys. The equal lengths of the legs 94, 96 and the base 98 and the 60 degree angles Θ, Ω, and β of equilateral triangles allow for a maximized surface area along the back plate 32 and provide the structural integrity necessary for forces applied to the back plate 32 when the brake caliper assembly is activated. Although in one embodiment, all three angles, Θ, Ω, and (3, are 60°, these angles can be increased or decreased based upon the desired surface area and/or structural integrity of the back plate 32. The first angle Θ may be between about 15° and about 120°, or between about 30° and about 90°, or about 60°. Because the thickness X1 of the back plate 32 is pre-determined due to any one of the above mentioned restrictions, the angles utilized determine the lengths of the legs 94, 96 and the width W. As the first angle Θ increases, the lengths of the legs 94, 96 increase and the length of the width W increases, however, the number of ridges that can be included along the back plate 32 decreases. Conversely, as the first angle Θ decreases, the lengths of legs 94, 96 decrease and the width W decreases, however the number of ridges that can be included along the back plate 32 increases. As the lengths of the legs 94, 96 and the width W are altered, particularly the lengths of legs 94, 96, the surface area of the back plate 32 changes. Further, as the first angle Θ increases above 60°, the plurality of ridges loses structural integrity. By using equilateral triangles, the structural integrity and the surface area of the plurality of ridges 42, and, subsequently the back plate 32, are maximized.

The greater surface area of the back plate 32 allows heat to dissipate more quickly from the friction lining pad 34. The equilateral triangular ridges on the back plate 32 of the preferred embodiment are ideal for strength and for creating the greatest surface area for heat dissipation. The more quickly the friction lining pad 34 cools, the quicker the vehicle can stop with the least wear to the friction lining pad 34. In previous back plate designs, the back plates are modeled to allow air flow directly across the planar back plate, generally with laminar flow, to cool the back plate and, as a result, the friction lining pad cools due to convection cooling as discussed above. In the embodiments disclosed herein, the plurality of ridges 42 form channels through which air flows over the plurality of valleys 46 and the plurality of peaks 44 of the plurality of ridges 42. Ideally, each of ridges 42 is parallel to the direction of air flow to achieve the most efficient cooling. In the parallel scheme, the air contacts the greatest surface area of the back plate 32. For example, if the plurality of ridges 42 were perpendicular to the direction of air flow, the first ridge 42a would form a mountain, and the air flow would be directed above the other channels. Due to fluid dynamics, the air flow in this situation does not flow up and down the first ridge 42a, but rather passes over the remaining plurality of ridges 42 without entering the plurality of valleys 46. In the preferred design, with the plurality of ridges 42 parallel to the direction of air flow, the air contacts the hot particles in the channels, pushes them out of the brake caliper assembly 20, and replaces those hot particles with cooler air. In some embodiments, the plurality of ridges 42 are only disposed along a portion of the back plate 32, wherein a portion of the back plate 32 has a planar surface.

Testing

Multiple road tests were conducted to determine performance characteristics of several brake pads, including a device embodying characteristics of the brake pad device 26 discussed above (hereinafter, "brake pad device") and a prior art brake pad (hereafter, "prior art brake pad"). Temperature profiles and stopping distances were measured to determine the performance of the brake pad device and the prior art brake pad. Each of the brake pad device and the prior art brake pad were tested during comparable weather and road conditions. Accordingly, the following examples are presented for illustrative purposes and should not be regarded as limiting.

Road tests were performed on the brake pad device and a prior art brake pad having the following specifications and being tested under the following conditions. The brake pads, i.e. the brake bad device and the prior art brake pad, were separately installed on a 2009 Volkswagen Routan SEL Minivan (VIN #2V8HW54X59R500958), weighing 6,050 pounds, for each of the tests. For testing, the torque of the wheels of the Minivan were set to 100 $lb_f$-ft. Static testing temperatures of 150 degrees Fahrenheit were consistently reproduced with the rotors using a generator, fans, and temperature gun throughout testing. After each test, a laser gun temperature sensor was used to monitor temperature profiles. Additionally, the stopping distances were recorded. The same driver was used during all tests.

A first road test ("Road Test #1") was conducted. Napa Premium Brakes (Part #55-8439-M) were used to represent the prior art brake pads, and were the only brake pads used during the first road test. During the first road test, the air temperature was 80 degrees Fahrenheit, with a humidity level of 81%, and a pavement temperature of 110 degrees Fahrenheit. Information on the atmospheric conditions during Road Test #1 is shown in Table No. 2.

A second road test ("Road Test #2") was conducted. A brake pad device similar to the brake pad device 26, described in the embodiments above, was installed on the aforementioned Minivan and multiple trials were performed. During the road test, the air temperature was 86 degrees Fahrenheit, with a humidity level of 82%, and a pavement temperature of 130.2 degrees Fahrenheit. Information on the atmospheric conditions during Road Test #2 is shown in Table No. 2. Table No. 1 also lists the different road tests and the type of brake pad used for each road test.

TABLE NO. 1

Brake Specification

| Road Test Number | Type of Brake Pad |
|---|---|
| 1 | Prior Art Brake Pad |
| 2 | Brake Pad Device |

TABLE NO. 2

Test Conditions

| Road Test Number | 1 | 2 |
|---|---|---|
| Air Temperature (° F.) | 80 | 86 |
| Humidity (%) | 81 | 82 |

During both of the road tests, i.e., Road Test #1 and Road Test #2 described above, seven trials were performed for differing braking methods, including: a long stop at 60 mph, a light stop at 35 mph, a hard stop at 30 mph, a panic stop at 30 mph, a panic stop at 60 mph, a light stop-go-stop at 30 mph, and a hard stop-go-stop at 60 mph. During all of the trials, the temperature of the left brake, the right brake, the left rotor, and the right rotor were measured. Additionally, the stopping distances for all trials, excluding the stop-go-stop trials, were measured. The results of each of the trials, which were completed during one of the two road tests, are present in Table No. 3 and 4.

TABLE NO. 3

Road Test #1 Results

| | TEMPERATURE IN FAHRENHEIT | | | | Stopping |
|---|---|---|---|---|---|
| | Left Brake | Right Brake | Left Rotor | Right Rotor | Distance (feet) |
| LONG STOP (60 mph-0) | 140 | 159 | 223 | 237 | 333' 5" |
| LIGHT STOP (35 mph-0) | 180 | 141 | 185 | 198 | 130' 6" |
| HARD STOP (30 mph-0) | 171 | 184 | 180 | 180 | 55' 7" |
| PANIC STOP (30 mph-0) | 125 | 162 | 172 | 159 | 35' 4" |
| PANIC STOP (60 mph-0) | 130 | 136 | 246 | 235 | 132' 4" |
| STOP-GO-STOP (LIGHT 30 mph) | 172 | 167 | 175 | 183 | N/A |
| STOP-GO-STOP (HARD 60 mph) | 193 | 168 | 240 | 232 | N/A |

TABLE NO. 4

Road Test #2 Results

| | TEMPERATURE IN FAHRENHEIT | | | | Stopping |
|---|---|---|---|---|---|
| | Left Brake | Right Brake | Left Rotor | Right Rotor | Distance (feet) |
| LONG STOP (60 mph-0) | 139 | 137 | 200 | 214 | 278' |
| LIGHT STOP (35 mph-0) | 136 | 128 | 164 | 168 | 123' 5" |
| HARD STOP (30 mph-0) | 137 | 136 | 166 | 176 | 59' 8" |
| PANIC STOP (30 mph-0) | 143 | 129 | 139 | 168 | 29' 1" |
| PANIC STOP (60 mph-0) | 154 | 152 | 249 | 230 | 113' 5" |
| STOP-GO-STOP (LIGHT 30 mph) | 142 | 121 | 153 | 153 | N/A |
| STOP-GO-STOP (HARD 60 mph) | 140 | 148 | 225 | 231 | N/A |

In order to compare the results, the results from Tables No. 3 and 4 are further presented in Tables No. 5 and 6. The temperature profiles of the temperature readings from the left brake pads during each road test are shown in Table No. 5. The temperature profile of the temperature readings from left rotor during each of the road tests are shown in Table No. 6. Additionally, Table No. 5 is presented graphically in FIG. 10 and Table No. 6 is presented graphically in FIG. 11. Further, the stopping distances for Minivan during trials from each of the road tests are shown in Table No. 7 and are presented graphically in FIG. 12.

TABLE NO. 5

Left Brake Pad Temperature (° F.)

| | Stop Light (35) | Long Stop (60) | Hard Stop (30) | Stop n Go (30) | Stop n Go (60) | Panic Stop (30) | Panic Stop (60) |
|---|---|---|---|---|---|---|---|
| Prior Art Pads | 180 | 140 | 171 | 172 | 193 | 125 | 130 |
| Brake Pad Device | 136 | 139 | 137 | 142 | 140 | 143 | 154 |

TABLE NO. 6

Left Rotor Temperature (° F.)

| | Stop Light (35) | Long Stop (60) | Hard Stop (30) | Stop n Go (30) | Stop n Go (60) | Panic Stop (30) | Panic Stop (60) |
|---|---|---|---|---|---|---|---|
| Prior Art Pads | 185 | 223 | 180 | 175 | 240 | 172 | 246 |
| Brake Pad Device | 164 | 200 | 166 | 153 | 225 | 139 | 249 |

TABLE NO. 7

Stopping Distances (Feet and Inches)

| | Stop Light (35) | Long Stop (60) | Hard Stop (30) | Stop n Go (30) | Stop n Go (60) | Panic Stop (30) | Panic Stop (60) |
|---|---|---|---|---|---|---|---|
| Prior Art Pads | 130' 6" | 333' 5" | 55' 7" | N/A | N/A | 35' 4" | 132' 4" |
| Brake Pad Device | 123' 5" | 278' | 59' 8" | N/A | N/A | 29' 1" | 113' 5" |

Figure 10:
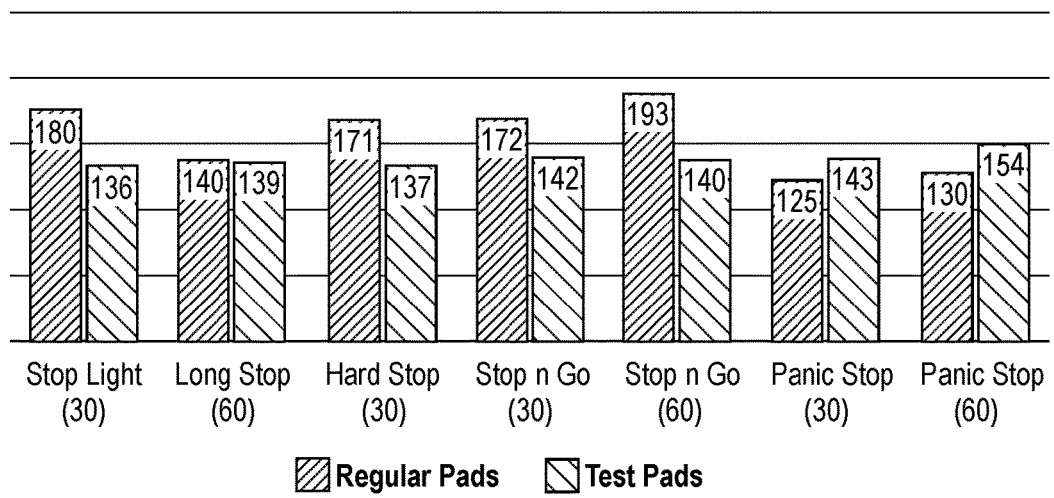
FIG. 10 illustrates a graph of the differences in brake pad temperatures for multiple brake pads during multiple braking methods.
Figure 11:
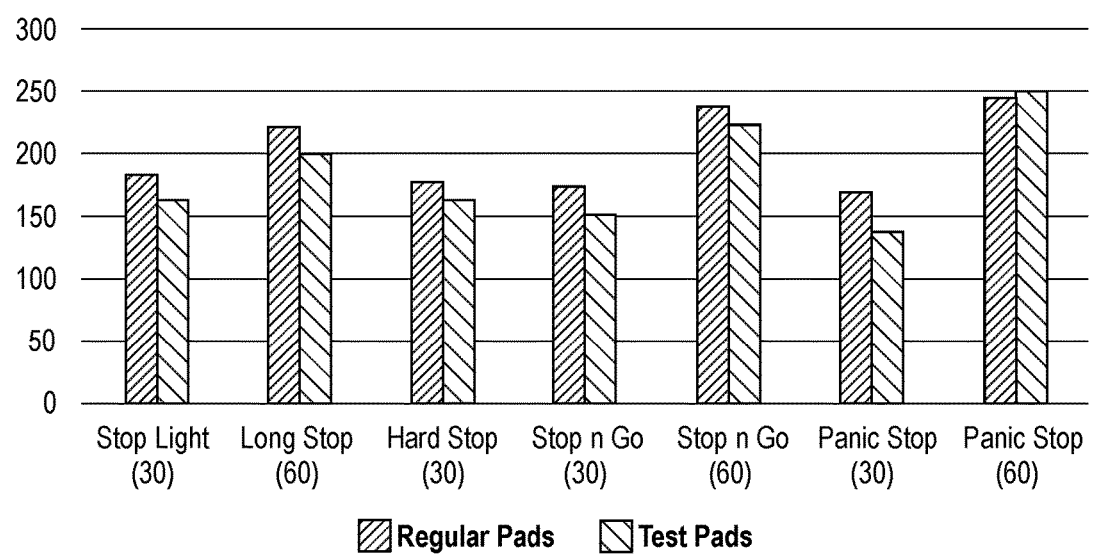
FIG. 11 illustrates a graph of the differences in rotor temperatures for multiple brake pads during multiple braking methods.
Figure 12:
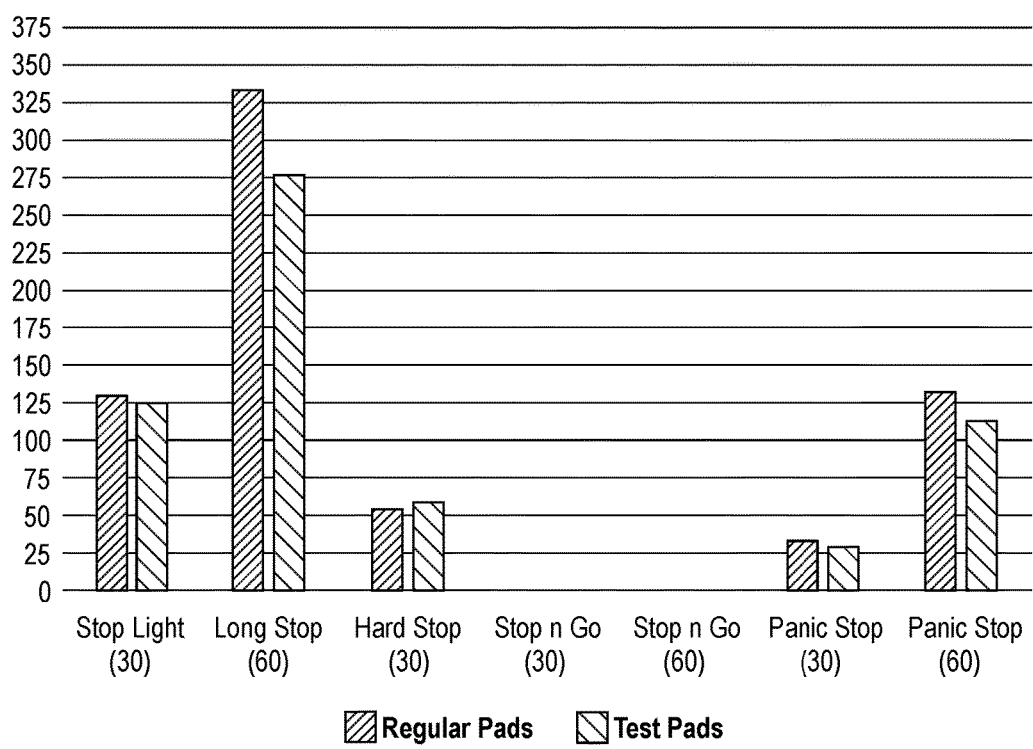
FIG. 12 illustrates a graph of the differences in stopping distances for multiple brake pads during multiple braking methods.

When referencing FIGS. 10, 11, and 12, it should be noted that the prior art brake pads are referred to as the "Regular Pads" and the braking device similar to the brake pad device 26 is referred to as the "Test Pads".

As previously mentioned, the brake pad device used throughout Road Test #2 is similar to the device 26 in that it included a back plate similar to the back plate 32 that had included thereon a plurality of ridges. The plurality of ridges increased the surface area of the back plate and therefore increased the possible surface area from which heat could transfer to the surrounding environment during warming thereof. As provided in the examples above and FIG. 10, the measured temperatures along the brake pad device were found to be lower than those measured along the prior art device for the trials that included the light stop trial at 35 mph, the long stop trial at 60 mph, the hard stop trial at 30 mph, the stop-and-go stop trial at 30 mph, and the stop-and-go stop trial at 60 mph trials. However, the measured temperatures for the prior art brake pad (Road Test #1) were found to be lower for each of the panic stop at 30 mph and the panic stop at 60 mph trials. Overall, measured temperatures for the brake pad device were found to be lower for five out of seven braking methods.

The results of road tests seem to indicate that the back plate used along the brake pad device allowed for heat to dissipate more quickly from the brake pad device, which resulted in a lower temperature therealong. The results of Road Test #1 and Road Test #2 show the brake pad device having lower temperature readings for five out of seven readings. These lower temperature readings may be attributed to an increased cooling rate produced by the plurality of ridges that were included on the back plate of the brake pad device. During the two trials where the temperature readings measured along the brake pad device were higher than those measured along the prior art device, i.e., the panic stop trial at 30 mph and the panic stop trial at 60 mph, the increased temperature could be attributed to ambient conditions during Road Test #2 (when the brake pad device was tested). During Road Test #2, a higher ambient air temperature and pavement temperature were measured than the measured air and pavement temperatures of the prior art brake pad device trials (Road Test #1). With a higher air and pavement temperature, it would be expected that analyzed parts of the car (including the brake pad device 26, the rotor 30, etc.) fr Road Test #2 may have had a higher initial or resting temperature than the car parts of Road Test #1.

FIG. 11 and Table No. 6 depict the temperature profile for the left rotor. The left rotor that utilized the device similar to the brake pad device 26, had lower temperature readings for the light stop trial at 35 mph, the long stop trial at 60 mph, the hard stop trial at 30 mph, the stop-and-go trial at 30 mph, the stop-and-go trial at 60 mph, and the panic stop trial at 30 mph. It can be gleaned from the results of Road Test #1 and Road Test #2 that the left rotor utilizing the brake pad device 26 had lower temperature readings for six out of the seven different braking trials outlined above. As previously mentioned, the trial where the temperature readings of the brake pad device were higher than those of the prior art brake pad could be due to the ambient temperature of Road Test #2 being higher than that of Road Test #1.

FIG. 12 and Table No. 7 depict the stopping distances for the trials of the prior art brake pads and the trials of the brake pad device similar to the brake pad device 26 described above. During the following trials, the brake pad device was found to have a shorter stopping distance than the prior art brake pad: the light stop trial at 30 mph, the long stop trial at 60 mph, the panic stop trial at 30 mph, and the panic stop trial at 60 mph. However, the prior art brake pad had a shorter stopping distance for the hard stop at 30 mph. No stopping distances were recorded for the stop-and-go 30 mph and 60 mph trials.

Overall, the results of Road Test #1 and Road Test #2 demonstrate that the brake pad device 26, along with the rotor, generally had lower temperature readings than the prior art brake pads and rotor. As illustrated from the results of the testing, due to the a more effective cooling rate produced by the brake pad device similar to the brake pad device 26, the friction lining pad thereof would not wear out as quickly as the friction lining pad of a prior art brake device. Therefore, the brake pad device 26 would have a longer life span and would not need to be replaced as often as the prior art brake pads. Further, as the brake pad device 26 would have a longer life span, the safety of automobile brakes may be increased. Additionally, the brake pad device 26 had shorter stopping distances, which would also potentially increase vehicle safety.

It will be appreciated by those skilled in the art that while the invention has been described above in connection with particular embodiments and examples, the invention is not necessarily so limited, and the numerous other embodiments, examples, uses, modifications and departures from the embodiments, examples, and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A device for braking an automotive vehicle comprising:
a first disc brake pad; and
a first back plate comprising a curved top side, a curved bottom side, a first face, a second face, and at least one locating tab, a first plurality of ridges provided on the first face of the first back plate, wherein the first disc brake pad is coupled to a second face of the first back plate that is opposite the first face,
wherein the first back plate is defined by a first length and a first width, the first length being greater than and perpendicular with respect to the first width, and an axis A that extends parallel with respect to the first length,
wherein the plurality of ridges extend parallel with respect to the axis A,
wherein the plurality of ridges extend along more than half of the first length, wherein the plurality of ridges are disposed along substantially the entire first width, and
wherein the first disc brake pad is capable of braking the automotive vehicle.

2. The device of claim 1 further comprising:
a second disc brake pad configured to be positioned opposite the first disc brake pad, wherein the second disc brake pad is defined by a second length and a second width; and
a second plate coupled with the second disc brake pad and comprising a second plurality of ridges provided on a first face of the second back plate.

3. The device of claim 1, wherein the first back plate is comprised of a metal.

4. The device of claim 1, wherein the first plurality of ridges includes a plurality of peaks and a plurality of valleys formed along the first back plate.

5. The device of claim 2, wherein each of the first and second pluralities of ridges includes at least one peak and at least one valley.

6. The device of claim 2, wherein the first and second disc brake pads include a gap.

7. The device of claim 2, wherein the first and second pluralities of ridges are triangular in shape.

8. The device of claim 2, wherein each of the first and second pluralities of ridges includes a plurality of peaks and a plurality of valleys formed along the first length of the first plate and the second length of the second plate.

9. The device of claim 8, wherein the first and second back plates are comprised of a metal.

10. The device of claim 8, wherein the first and second disc brake pads have at least one gap.

11. A device for dissipating heat from an automotive vehicle disc brake pad assembly comprising:
- a disc brake pad; and
- a first back plate coupled to the disc brake pad;
- wherein the first back plate includes a curved top side, a curved bottom side, a first face, a second face opposite the first face, and at least one locating tab, further comprising a plurality of peaks and a plurality of valleys forming a plurality of triangular ridges disposed along the first face,
- wherein the first back plate is defined by a length and a width, the length being greater than and perpendicular with respect to the width, and an axis A that extends parallel with respect to the length and substantially parallel to the elongate direction of the first brake pad,
- wherein the plurality of ridges extend parallel with respect to the axis A,
- wherein the plurality of ridges extend along more than half of the length, wherein the plurality of ridges are disposed along substantially the entire width, and
- wherein the disc brake pad is capable of braking an automotive vehicle.

12. The device of claim 11 further comprising:
- a rotor;
- a second disc brake pad; and
- a second back plate coupled to the second disc brake pad;
- wherein the second back plate includes a second plurality of peaks and a second plurality of valleys forming a plurality of second triangular ridges.

13. The device of claim 12, wherein the ridges are formed along the length of the first back plate and the second ridges are formed along an entire second length of the second back plate.

14. The device of claim 12, wherein the first and second disc brake pads are facing each other on opposite sides of the rotor.

15. A method of dissipating heat from an automotive disc brake pad assembly comprising:
- providing a brake caliper having a first disc brake pad; and
- attaching a first back plate to a first surface of the first disc brake pad that is opposite a cooling surface of the first back plate, the cooling surface of the first back plate having a first plurality of cooling channels formed therein,
- wherein the first back plate comprises a curved top side, a curved bottom side, a first face, a second face, and at least one locating tab,
- wherein the first back plate is defined by a length and a width, the length being greater than and perpendicular with respect to the width, and an axis A that extends parallel with respect to the length and substantially parallel to the elongate direction of the first brake pad,
- wherein the plurality of cooling channels extend parallel with respect to the axis A,
- wherein the plurality of cooling channels extend along more than half of the length, wherein the plurality of cooling channels are disposed along substantially the entire width, and
- wherein the first disc brake pad is capable of braking an automotive vehicle.

16. The method of claim 15, wherein the first plurality of cooling channels are formed by a first plurality of ridges.

17. The method of claim 16, wherein the first plurality of ridges includes a plurality of peaks and a plurality of valleys.

18. The method of claim 15, wherein the first back plate is comprised of a metal.

19. The method of claim 15, further comprising:
- providing the brake caliper having a second disc brake pad;
- attaching a second back plate to a first surface of the second disc brake pad, a cooling surface of the second back plate have a plurality of cooling channels formed therein.

20. The method of claim 19, wherein the second plurality of cooling channels are formed by a second plurality of ridges.

* * * * *